Figure 1:
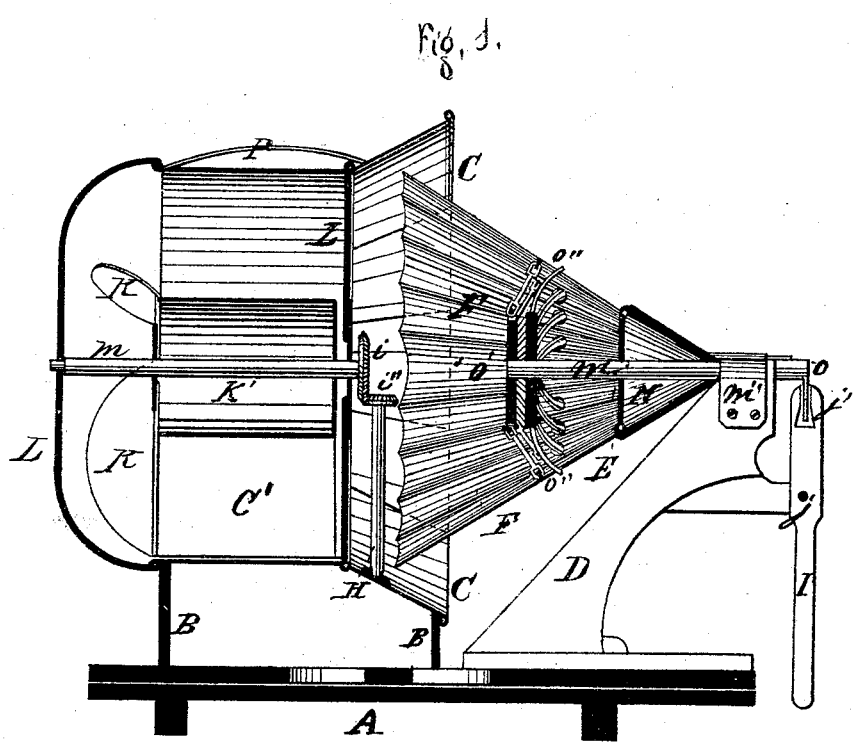

2 Sheets--Sheet 1.

S. PRATT.
Wind-Mills.

No. 147,282. Patented Feb. 10, 1874.

Witnesses.

Inventor:
Silas Pratt

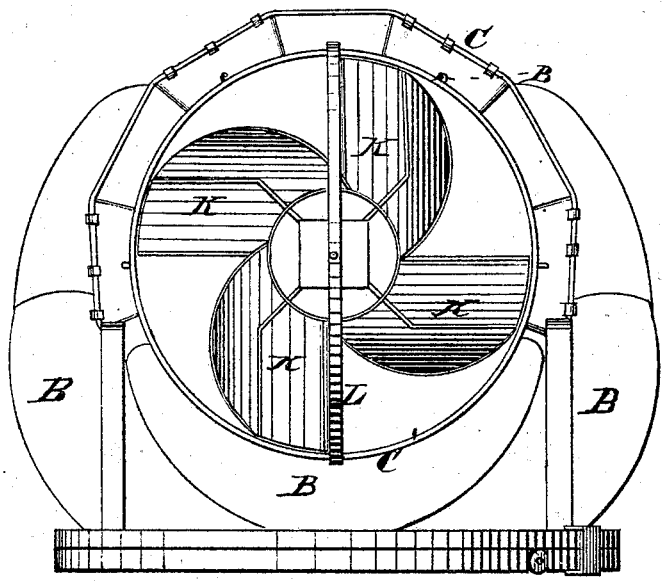

UNITED STATES PATENT OFFICE.

SILAS PRATT, OF TOWNSHIP ELEVEN, LANCASTER COUNTY, NEBRASKA.

IMPROVEMENT IN WINDMILLS.

Specification forming part of Letters Patent No. 147,282, dated February 10, 1874; application filed June 11, 1872.

*To all whom it may concern:*

Be it known that I, SILAS PRATT, of Township Eleven, Lancaster county, Nebraska, have invented certain Improvements in Windmills, of which the following is a specification:

The first part of my invention relates to the construction of an adjustable fan or shield, by which to regulate the quantity of wind to be let onto the wings of the driving-wheel, or to shut off entirely the wind from said wheel. The second part of my invention relates to a covering or shield to gather the wind to the fans of the wheel, and also to adjustable flaps attached to such shield, to allow the wind to pass through said shield and outside the regulating-shield, so as to relieve the pressure of the wind against the shield when the wind is cut off from the driving-wheel.

In the accompanying drawings, Figure 1 represents a partial side view and partial section of the windmill, and Fig. 2 a rear view of the same.

The windmill is mounted on a turn-table, A, which may be attached to any frame-work or building erected for the purpose. Upon this turn-table concave supports B B are secured to sustain the shields C C. Another bracket or support, D, sustains a long bearing, $m''$, of a horizontal shaft, $m'$, which has a longitudinal sliding movement in the said bearing, effected by means of a handle-lever, I, pivoted at $j$ to the bracket or support D, and embracing, by a dovetail notch, $j'$, a downward projection, $o$, of the shaft. The other end of the shaft $m'$ is connected with sets of brace-rods $o'$ and $o''$, secured to the ribs of the fan or shield F like the corresponding brace of an umbrella. The inner ends of the ribs or sections of the fan or shield are hinged or jointed to a cone-fulcrum, N, firmly secured to the support D. As the shaft $m'$ is moved outward, the sections of the fan or shield are more or less closed, and vice versa, thereby regulating the quantity of wind admitted to the fans or vanes K K of the wind-wheel, or even cutting it off entirely. Back of the regulating-fan F, and in front of the wind-wheel, and flaring outward beyond both, is a wind-gathering shield, C, the body or case C' back thereof, and surrounding the wind-wheel, being cylindrical. The flaring shield is composed of sections or separate flaps, as seen in Fig. 2, these sections being hinged to the frame of the shield, and held in position by springs P, so as to yield if the wind is too strong. The cylinder K', which bears the vanes K K of the wind-wheel, has a shaft, $m$, mounted in bearings L L, supported by the brackets B B, or directly by the turn-table A. This shaft is geared, by bevel-wheels $i$ $i''$, to a vertical shaft, H, by which the power is communicated to the machinery to be driven by the windmill.

What I claim as my invention, and desire to secure by Letters Patent, is—

1. The radially contractible and expansible shield F, constructed substantially as herein specified, in combination with the wind-wheel, in the manner and for the purpose herein specified.

2. The wind-gathering shield C, provided with hinged sections, and with springs P P, in combination with the wind-wheel, substantially as shown and described.

SILAS PRATT.

Witnesses:
J. H. MERRILL,
WM. MARTIN.